United States Patent [19]
Murphy

[11] 3,934,600
[45] Jan. 27, 1976

[54] LUBRICANT SYSTEM

[75] Inventor: William C. Murphy, Fremont, Mich.

[73] Assignee: Shock V Automatic Lubrication Systems, Inc., Fremont, Mich.

[22] Filed: Dec. 2, 1974

[21] Appl. No.: 528,653

Related U.S. Application Data

[63] Continuation-in-part of Ser. No. 382,892, July 26, 1973, abandoned.

[52] U.S. Cl. .................................. 137/2; 137/625.5
[51] Int. Cl.² ..................... F16K 11/07; F16K 3/04
[58] Field of Search ........... 137/625.5, 625.65, 1, 2, 137/571

[56] References Cited
UNITED STATES PATENTS

| | | | |
|---|---|---|---|
| 2,619,116 | 11/1952 | Ralston | 222/571 X |
| 3,012,581 | 12/1961 | Wilson | 137/625.5 |
| 3,446,246 | 5/1969 | Huley | 137/625.5 |
| 3,550,632 | 12/1970 | Noakes | 137/625.65 |
| 3,628,617 | 12/1971 | Ferrigan | 222/318 X |
| 3,785,456 | 1/1974 | McIntire et al. | 184/15 R X |

Primary Examiner—Henry T. Klinksiek
Attorney, Agent, or Firm—Price, Heneveld, Huizenga & Cooper

[57] ABSTRACT

Liquid lubricant dispensing apparatus employing a solenoid plunger valve in a recirculated lubricant conduit, the valve being operable to temporarily uncover a valve seat leading to a capillary discharge having insignificant volume. A controlled quantity of dynamically circulating lubricant is discharged from the capillary with momentary shifting of the valve resulting in a shock pulse being applied on the liquid to the capillary discharge.

4 Claims, 5 Drawing Figures

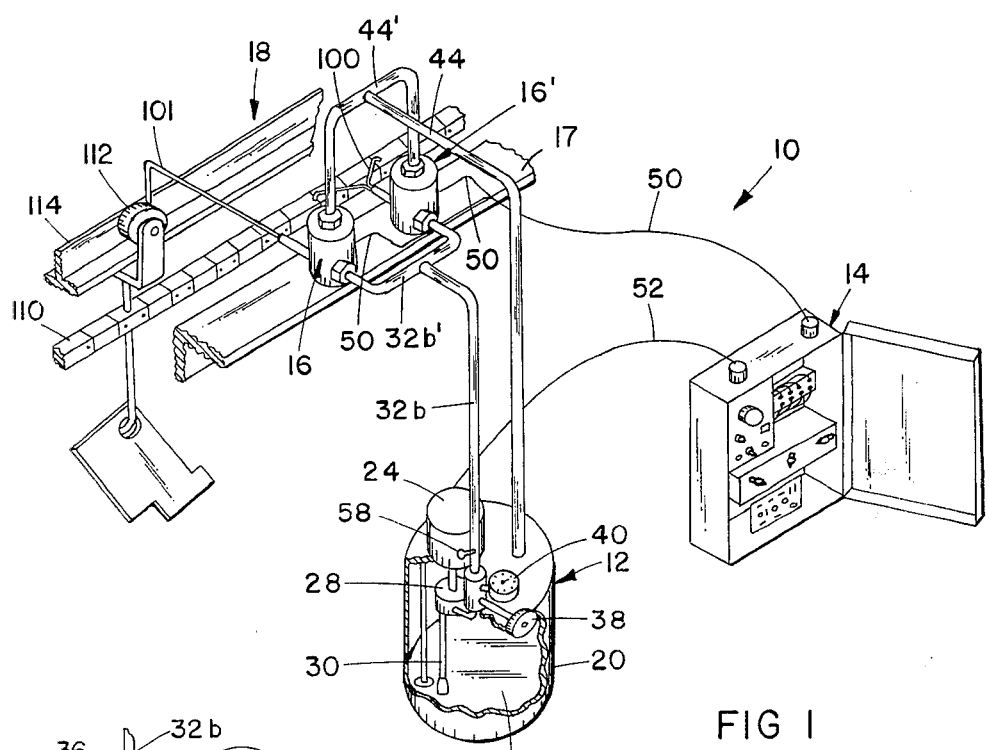
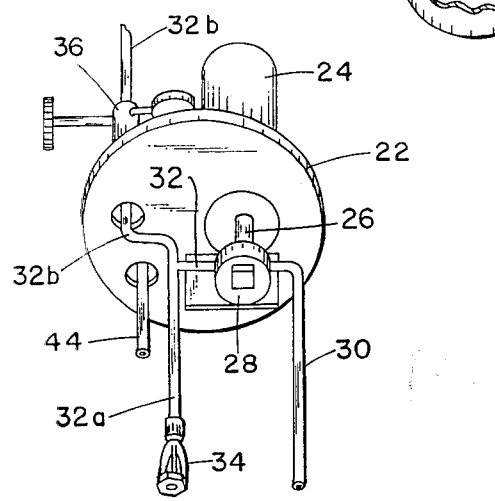
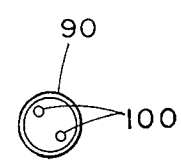
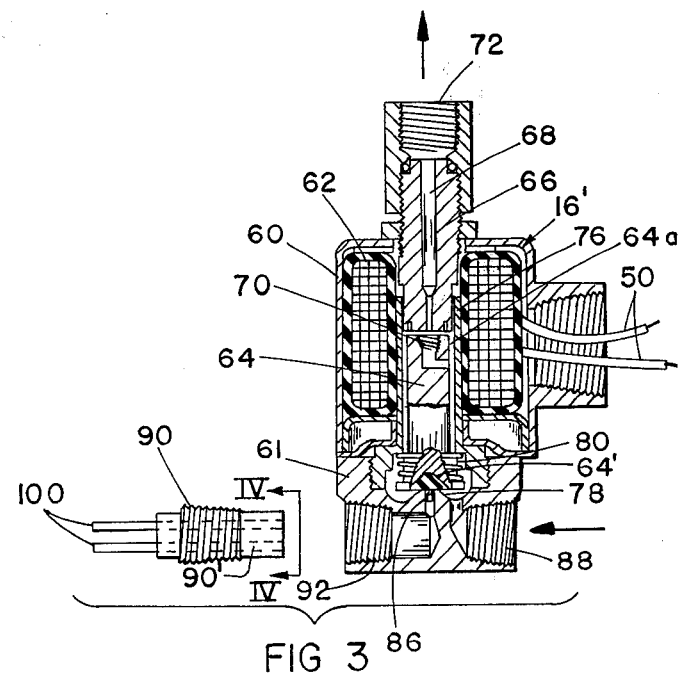
FIG 1
FIG 2
FIG 4
FIG 3

LUBRICANT SYSTEM

RELATED APPLICATION

This is a continuation-in-part application of copending application Ser. No. 382,892 entitled LUBRICANT SYSTEM, filed July 26, 1973, now abandoned.

BACKGROUND OF THE INVENTION

This invention relates to dispensing of controlled amounts of liquid, and particularly relates to dispensing of liquid lubricants. It has special value for dispensing controlled quantities of suspension type, low viscosity lubricants.

One of the most effective lubricants marketed in recent years is the suspension type wherein a solid particulate lubricant such as molybdenum disulfide is suspended in a liquid carrier, preferably a low viscosity volatile organic liquid, e.g. "Dri-Slide" brand lubricant marketed by Dri-Slide, Inc. of Fremont, Mich. Such lubricants are so effective and so freely dispensible that over-use is an ever present tendency. In many applications, over-use results only in waste of lubricant. However, in some applications, over-use can result in lubricant flowing or dripping onto other than the intended equipment. As an example, it is a common practice to apply suspended type lubricants to conveyor wheels and chains. In fact, where the conveyor passes through pickling zones, paint spray zones, high heat zones as in ovens, or other conditions tending to destroy the lubricant and/or disrupt the bearing surfaces, the common practice is to lubricate the conveyor components at every recirculating pass. If excess lubricant is applied, it tends to flow or drip onto the goods supported by the conveyor. This can be a nuisance or even intolerable, as where it drips on white goods about to undergo further treatment.

Consequently, efforts have been expended to controllably dispense selected qualtities of lubricant, as through valved ejectors wherein the valve opened for a fraction of a second, at intervals, as with passage of conveyor components to be lubricated. It was soon learned however that lubricants, particularly of the suspension-type, are not readily controllably dispensed. Specifically, it was discovered that opening of the dispensing valve for a controlled time did not necessarily determine the timing, or the amount, or the character of the lubricant ejected. The lubricant did not seem to eject very forcefully unless high air pressure forces were used, and tended to be nonuniform in composition, usually being too high in carrier and too low in particulate. Also, the lubricant tended to continue dispensing in dribble or dripping fashion after the valve was closed and the conveyor component had passed. Often it separated into the particulate and carrier components in the valve and dispensing tubes leading from the valve, tending to plug the system. These results occurred even though the system was very technically sophisticated and expensive.

Upon realizing these factors, a great many experimental structures and combinations were tried in efforts to achieve controlled dispensing.

SUMMARY OF THE INVENTION

This invention was discovered to achieve controlled dispensing of liquid lubricants, even of the suspension type, so that dispensing of predetermined quality lubricant is achieved in a selected quantity, within the determined time interval measured in milliseconds under repeatable ejection force.

These objects are achieved by the controlled use of the dynamic liquid flow shock effect to impart momentary liquid shock impetus into a capillary dispensing tube or tubes. The tube has a restricted outlet, and when used to dispense a suspension type lubricant, is also of basically capillary size, remaining full of liquid at all times. The connection from the capillary tube to the seat of the control valve is purposely limited in volume to an insignificant amount.

An important object of this invention therefore is to harness the normally undesirable liquid flow shock effect occurring with valve closure in a circulated flow system, and employ such for controlled dispensing of liquid through capillary tubes.

These and other objects, features, and advantages will be apparent from the following detailed description, in conjunction with the drawings.

BRIEF DESCRIPTION OF THE DRAWINGS

FIG. 1 is a perspective view of the novel system, showing one type of installation;

FIG. 2 is a perspective view of the liquid recirculating components forming a portion of the apparatus in FIG. 1;

FIG. 3 is a sectional, partially exploded view of one of the control valve units in the apparatus of FIG. 1;

FIG. 4 is a view taken on plane IV—IV of FIG. 3; and

DESCRIPTION OF THE PREFERRED EMBODIMENTS

Figure 5:
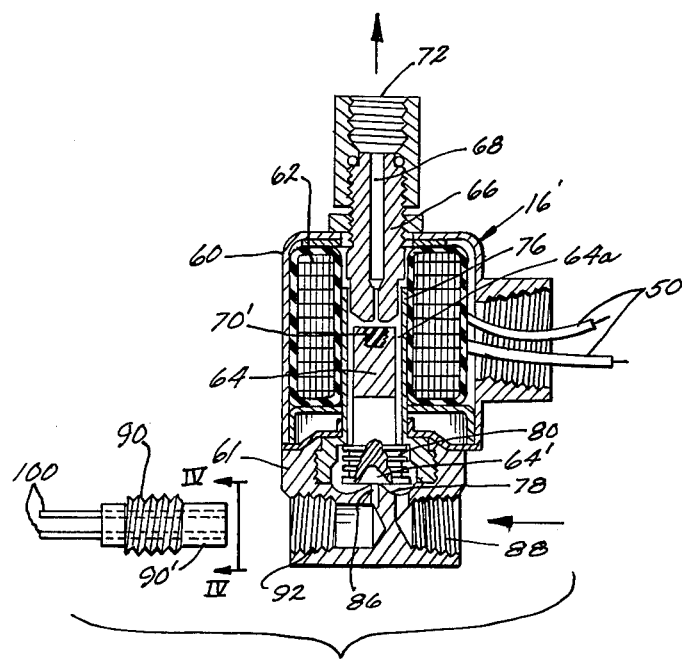
FIG. 5 is a sectional, partially exploded view of a modified control valve unit in the apparatus of FIG. 1.

Referring now specifically to the drawings, the apparatus 10 therein depicted includes a liquid recirculating subassembly 12, a control panel subassembly 14, and solenoid control valve subassemblies 16 and 16', shown mounted on support 17 and cooperating with the components of a conveyor subassembly 18.

Since this invention was developed for dispensing of lubricants, and particularly for dispensing of suspension type lubricants, the illustrated embodiments are depicted and will be explained basically relative thereto. It is realized that this invention could conceivably be applied to other liquids, but it has particular uniqueness relative to the dispensing of suspension type lubricants, especially when the shock effect is coupled with the capillary discharge means in the particular fashion set forth hereinafter.

Subassembly 12 includes a vessel 20 such as a typical barrel containing the liquid lubricant L. The invention has particular applicability to suspension type lubricants such as molybdenum disulfide suspended in an organic volatile carrier. As far as is known, no apparatus has previously been capable of controlled accurate dispensing of such materials, in spite of repeated efforts in this regard.

The top of vessel 20 is fitted with a cover 22 to which recirculating components are mounted. Specifically, a motor, preferably an electrical motor 24 or the like, is mounted to the top of the cover, and has its output shaft 26 projecting down through the cover. This shaft is connected to a conventional pump 28 on the underside of the cover. Leading to the inlet side of this pump is an intake conduit 30 which has its inlet port adjacent the bottom of container 20. The outlet 32 from pump 28 is branched, having one branch 32a leading back down to the bottom of the container, with an agitator 34 of conventional type mounted on the lower end thereof. Constant flow through this agitator maintains the solid particulate material in proper suspension in the liquid carrier within the drum. The other branch 32b extends out of the container through a suitable control valve 36 operated by actuator 38 and to which a pressure gauge 40 is attached. Conduit 32b then extends to one or more control valves 16, 16' etc. Two of such valves are shown here for illustrative purposes. Conduit 32b supplies lubricant to both valves through branched portion 32b'. A return conduit means is provided from the outlets of the solenoid valves, such return conduit 44 having a branched portion 44' from the two valves, and having a common portion extending back into vessel 20 (FIG. 2). This arrangement allows the lubricant to be recirculated i.e. not only from pump 28 to agitator 34 to maintain the material in uniform condition within the vessel, and also from pump 28 through conduit members 32, 32b, 32b', then through valve members 16, 16', and returning through conduits 44', 44 back to vessel 20 to prevent settling of particulate material in the supply lines and return lines.

Controller subassembly 14 is employed to enable selective discharge of controlled quantities of the lubricant from the solenoid valves. The controller may be highly sophisticated or very simple in nature, enabling the dispensing action to occur during a controlled exact amount of time usually measured in milliseconds. Normally, it is electrically actuated, and includes electrical timer means for accurate regulation of valve shifting time. This control subassembly is operably associated with each of the solenoid valves through suitable electrical leads 50 for activation of the solenoid windings. Another lead 52 extends between controller 14 and a pressure switch 58 in conduit 32b to cause pump 28 and motor 24 to stop when the drum is empty and optionally, to signal the human operator.

The two solenoid valves may be alike. One embodiment is shown and described in detail in FIG. 3. A second and preferred embodiment is shown in FIG. 5. The preferred embodiment will be described first.

Each of the solenoid valve units, e.g. valve 16' includes a housing 60 enclosing an annular coil 62 to which the leads 50 connect. Within the center of the coil is a reciprocable core plunger 64 above which, on one axial end thereof, is a plunger stop 66 fixedly retained relative to the coil and housing. Stop 66 has a nose with a passageway 68 therethrough from one end of element 66 to the other, the lower end of the passageway communicating with the valve chamber at the axial end of plunger 64, and the upper end of the passageway communicating with the outlet 72 from the valve. Around plunger 64 is a plunger guide 76 which enables the plunger to reciprocate between a position wherein its lower end valve 64' can shift into engagement with or out of engagement with valve seat 78 on the valve body 61 secured to the housing 60. A compression coil spring 80 between the lower end of plunger 64 and the adjacent housing portion biases the plunger downwardly to cause valve 64' to engage valve seat 78 and close off the second outlet port 86. Plunger 64 includes axially oriented slots 64a around its periphery to allow fluid entering valve body 61 at valve inlet 88 to flow through these slots 64a to passageway 68 to main outlet 72 for recirculation of the liquid through the valve when the plunger is in the position shown in FIG. 5, without stagnation of the fluid. Outlet 86 can be opened by momentarily elevating valve 64' by actuation of the solenoid coil 62 to impart an upward axial thrust to plunger 64 against the bias of compression spring 80. When plunger 64 is momentarily shifted thusly, resilient valve seat 70', in the end opposite valve seat 64', contacts the nose of element 66 to momentarily shut off flow to passageway 68. This restriction of the dynamically flowing fluid then momentarily imparts a high pressure shock pulse to the capillary tubes because the flowing liquid is suddenly brought almost totally to a stop. The capillary tubes are very small compared to the valve inlet 88 and outlet 68 and thus have almost insignificant volume.

In accordance with the preferred form of this invention, the one or more capillary size conduits extend from the valve body outlet orifice 86. These capillary tubes should normally be less than about 0.050 inch for commercially available suspension type lubricants such as DRI-SLIDE brand lubricant sold by Dri-Slide, Inc. of Fremont, Michigan. Typically, the tubes will be about 0.026 to 0.031 inch internal diameter but can vary depending upon the relative capillarity resulting between the liquid and the tube material and surface. In all instances, the other flow passageways are many times the capillary tubes in area and volume. In dispensing suspension type lubricants, it is also important to cause the volume of liquid between valve seat 78 and the capillary tube discharge orifice to be insignificant. Thus, fitting 90 extending into threaded orifice 92 of valve body 61 has a nose portion 90' which extends to a position immediately adjacent passageway 86, with the capillary tubes 100 extending clear through the fitting so that the inlet ends of the capillaries are closely adjacent passage 86. The area around the capillary tubes is completely filled as with solder or the like. Thus, when fitting 90 is inserted into the threaded opening 92, there will be no significant liquid volume, i.e. only an amount sufficient to enable the lubricant to fill the capillary tubes. It has been found that by the use of these capillary tubes in the combination, the cross sectional area is so small that the solid particulate materials in the lubricant do not tend to appreciably settle out and separate from the liquid carrier. The capillary tubes 100 can be configurated as desired to cause the discharge end thereof to be at the point to be lubricated, e.g. adjacent conveyor chain 110 as to lubricate the links of the chain for example. The outlet ends of the tubes can be directed upwardly as well as downwardly. The one or more capillaries 101 extending from solenoid valve 16 can be oriented as for example, to lubricate rollers 112 of a suspension type conveyor, riding on a track 114 in typical fashion. The outlet ports from the capillary tubes are normally the same size as the tube internal diameter. With some liquids, a somewhat larger internal diameter may be employed, but it is usually desirable to maintain a small outlet port.

Controller 14 is normally arranged to enable the respective solenoid valves 16, 16' etc. to be activated for a controlled number of milliseconds, normally from about 2 to 30, e.g. 8 milliseconds for valve 16' and 20 milliseconds for valve 16, so that, by use of the shock effect to be described, the controlled amount of lubricant is dispensed and only that amount.

In operation, with motor 24 activated, and cover 22 placed on drum 20 of lubricant L, the lubricant is constantly recirculated through agitator 34 and also is circulated through the conduit system including the solenoid valves. Thus, lubricant entering through branch conduit 32b' enters inlet 88 (FIG. 3) and flows through valve body 61, up axial passages 64a of plunger 64, through passageway 68, and out outlet 72 to conduit 44' and 44, hence back to the container. Periodically, when solenoid valves 16 and/or 16' are actuated on a controlled basis, windings 62 are energized to shift plunger 64 momentarily upwardly, i.e. against the bias of coil spring 80, to separate valve 64' from valve seat 78, and to stop the flow out passageway 68 by closing valve seat 70' against the nose of element 66, momentarily causing the dynamically flowing lubricant to apply a high pressure shock pulse to the dispensing outlet passage 86 to and through capillaries 100. After a controlled very short time interval of some milliseconds, power is cut off to coil 62, allowing spring 80 to shift valve 64' back against the valve seat. This shock effect occurring in fluid flow systems is normally undesirable. In this particular combination, the occurrence of the shock energy has been found to admirably achieve exact controlled discharge from the capillary outlet, causing discharge from the capillary tubes of a specific amount of liquid. Further, this is not followed by dripping or continuous dribbling discharge as has occurred in prior devices. Hence, by simply adjusting the time interval of valve opening to the controlled number of milliseconds, it has been found that very finely controlled quantities of lubricant can be repeatedly and dependably dispensed. Furthermore, the lubricant is of predictable quality, not having separated out in the relatively insignificant volume downstream from valve 64'. If more than one capillary extends from the same outlet e.g. two capillaries as shown or more, care should usually be taken to cause the lower discharge end of these capillaries to be at approximately the same elevation if the inlet ends of the capillary tubes are in communication, to prevent siphoning of liquid from the upper capillary to the lower one after the valve is closed.

The solenoid valve 16' in FIG. 3 includes housing 60 enclosing annular coil 62 to which leads 50 connect. Within the center of the coil is reciprocable core plunger 64 above which, one axial end thereof, is plunger stop 66 fixedly retained relative to the coil and housing. Stop 66 has passageway 68 therethrough from one end to the other, the lower end of the passageway communicating with axial slots 64a via the valve chamber above plunger 64, and passageway 70 in plunger 64, and the upper end of which communicates with recirculating outlet 72 from the valve. Around plunger 64 is plunger guide 76 which enables the plunger to reciprocate between a position wherein its lower end valve 64' can shift into engagement with or out of engagement with valve seat 78 on valve body 61 secured to housing 60. Compression coil spring 80 between the lower end of plunger 64 and the adjacent housing portion biases the plunger downwardly to cause valve 64' to normally engage valve seat 78 and close off outlet port 86. Plunger 64 includes axially oriented slots 64a around its periphery to allow fluid flow entering valve body 61 via inlet 88 to flow through these slots 64a to passageway 68 both through passageway 70 and through the valve chamber at the end of plunger 64 to main outlet 72 for constant recirculation of the liquid through the valve, without stagnation of the fluid. Outlet 86 can be opened by momentarily elevating valve 64' by actuation of solenoid coil 62 to impart an upward axial thrust to plunger 64 against the bias of compression spring 80, until the upper axial end of plunger 64 abuts against the lower axial end of plunger stop 66.

In the embodiment of the valve 16' in FIG. 3, the first outlet 68 is thus not closed off completely when plunger 64 is momentarily shifted, since, although the liquid flow around the end of plunger 64 is stopped, some flow can occur through passage 70 in plunger 64 at the same time that the shock pulse drives lubricant out capillaries 100. This arrangement can be employed if another solenoid valve is downstream in a series relation, as opposed to the parallel arrangement shown in FIG. 1. Since the flow through the first (upper) outlet is not stopped totally, the shock pulse is not as strong as in FIG. 5, and thus the unit in FIG. 5 is preferred.

In spite of its simplicity, the invention achieves remarkably controlled dispensing. It is conceivable that certain deviations of construction may be employed and in fact will probably be necessary to suit a particular type of installation within the concept set forth herein. Hence, the invention is intended to be limited only by the scope of the claims appended hereto rather than to the specific preferred embodiments depicted as illustrative.

The embodiments of the invention in which an exclusive property or privilege is claimed are defined as follows:

1. Lubricant dispensing apparatus employing a shock pulse, comprising:
   lubricant source means;
   recycle conduit means having an outlet from said source means and a return back to said source means;
   solenoid valve means in said conduit means, including an inlet from said conduit means, a first outlet back to said conduit means, and a second outlet;
   a fitting in said second outlet including at least one capillary discharge tube therefrom, for dispensing lubricant;
   a valve seat at said second outlet, said solenoid valve means including a plunger shiftable from a first position on said valve seat closing said second outlet while said first outlet is open for dynamic recirculatory flow of lubricant from said source means through said conduit means and said valve means, to a second valve position momentarily restricting the recirculatory dynamic flow while opening said second outlet and exposing said capillary outlet means to the shock pulse from the restricted dynamic lubricant flow;
   said valve means having a minimal amount of volume between said valve seat and said fitting, whereby insignificant amounts of lubricant are retained downstream of said valve seat including said capillary discharge tube.

2. Apparatus for dispensing comprising:
   recycle conduit means having an outlet conduit from the source and a return back to the source;
   valve means in said conduit means, including an inlet from said conduit means, a first outlet back to said conduit means, and a second outlet;
   a fitting in said second outlet, said fitting having only capillary outlet means including at least one capillary discharge tube therefrom;
   a valve seat at said second outlet, said valve means including a plunger shiftable from a first position on said valve seat closing said second outlet while said first outlet is open for dynamic recirculatory flow from said source means through said conduit means and said valve means, to a second valve position momentarily restricting the recirculatory dynamic flow while opening said second outlet and exposing said capillary outlet means momentarily to the dynamic effect of the flow effecting a shock pulse on said capillary outlet means for controlled dispensing therefrom.

3. A method of controllably dispensing suspension type lubricants using a dynamic liquid flow shock effect comprising the steps of:

circulating the suspension type lubricant past a valve outlet to capillary discharge tubes less than about 0.050 inch in internal diameter, thereby keeping the lubricant in dynamic flow and suspended;

momentarily opening the valved outlet for some milliseconds while suddenly restricting the lubricant dynamic flow, thereby exposing the capillary discharge tubes to a shock pulse from the dynamically flowing lubricant, causing a pulse of lubricant flow through the capillary discharge tubes, to thereby enable the liquid flow shock effect to assist in discharge quantity control.

4. A method of controllably dispensing liquid using a dynamic liquid flow shock effect comprising the steps of:

circulating the liquid past a valved outlet to capillary discharge tubes, thereby keeping the liquid in dynamic flow;

momentarily opening the valved outlet for some milliseconds while restricting the liquid dynamic flow, thereby suddenly exposing the capillary discharge tubes to the dynamically flowing liquid for imparting a shock pulse, causing a pulse of liquid flow through the capillary discharge tubes, to thereby enable the liquid flow shock effect to assist in discharge quantity control.

* * * * *